United States Patent Office

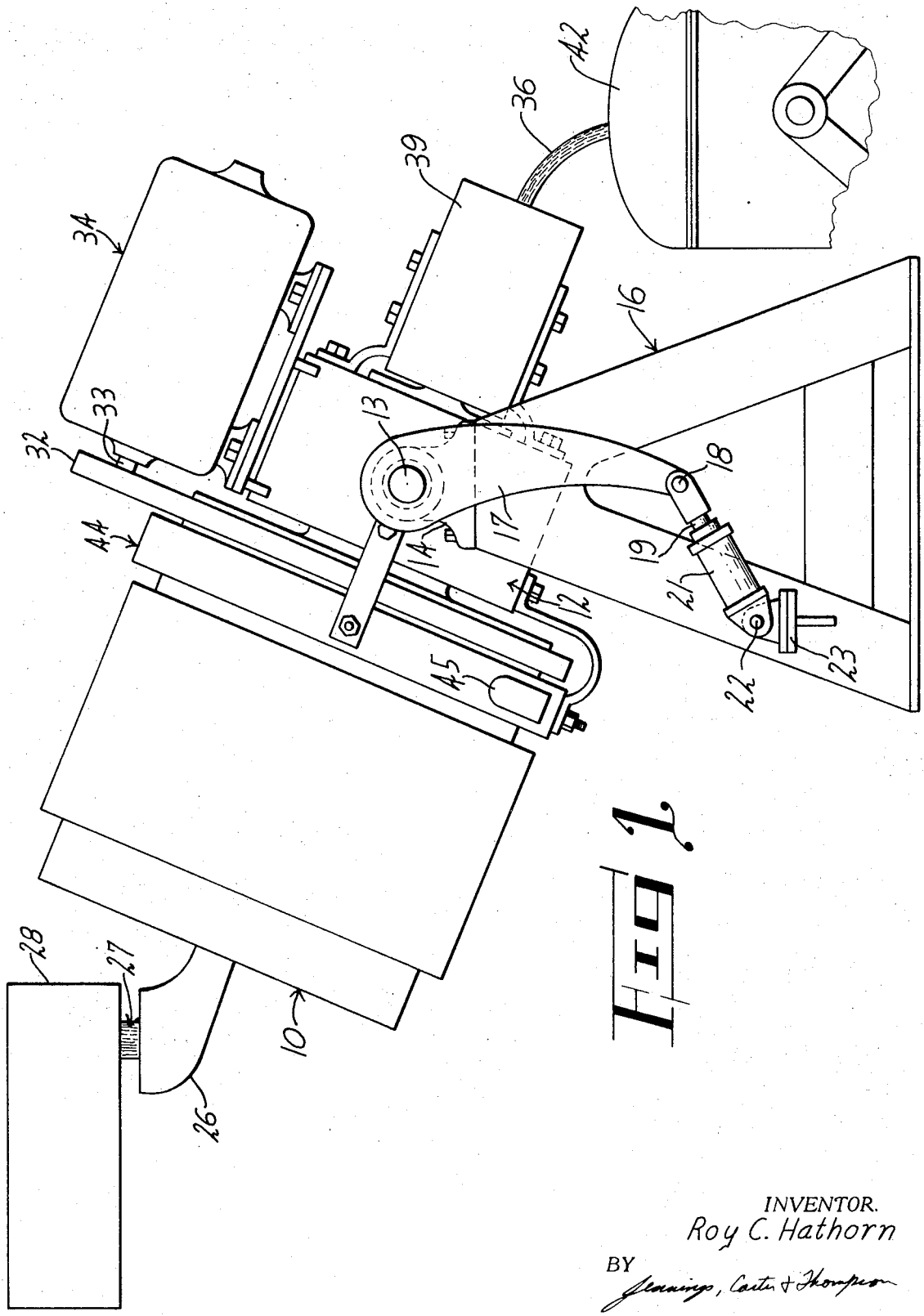

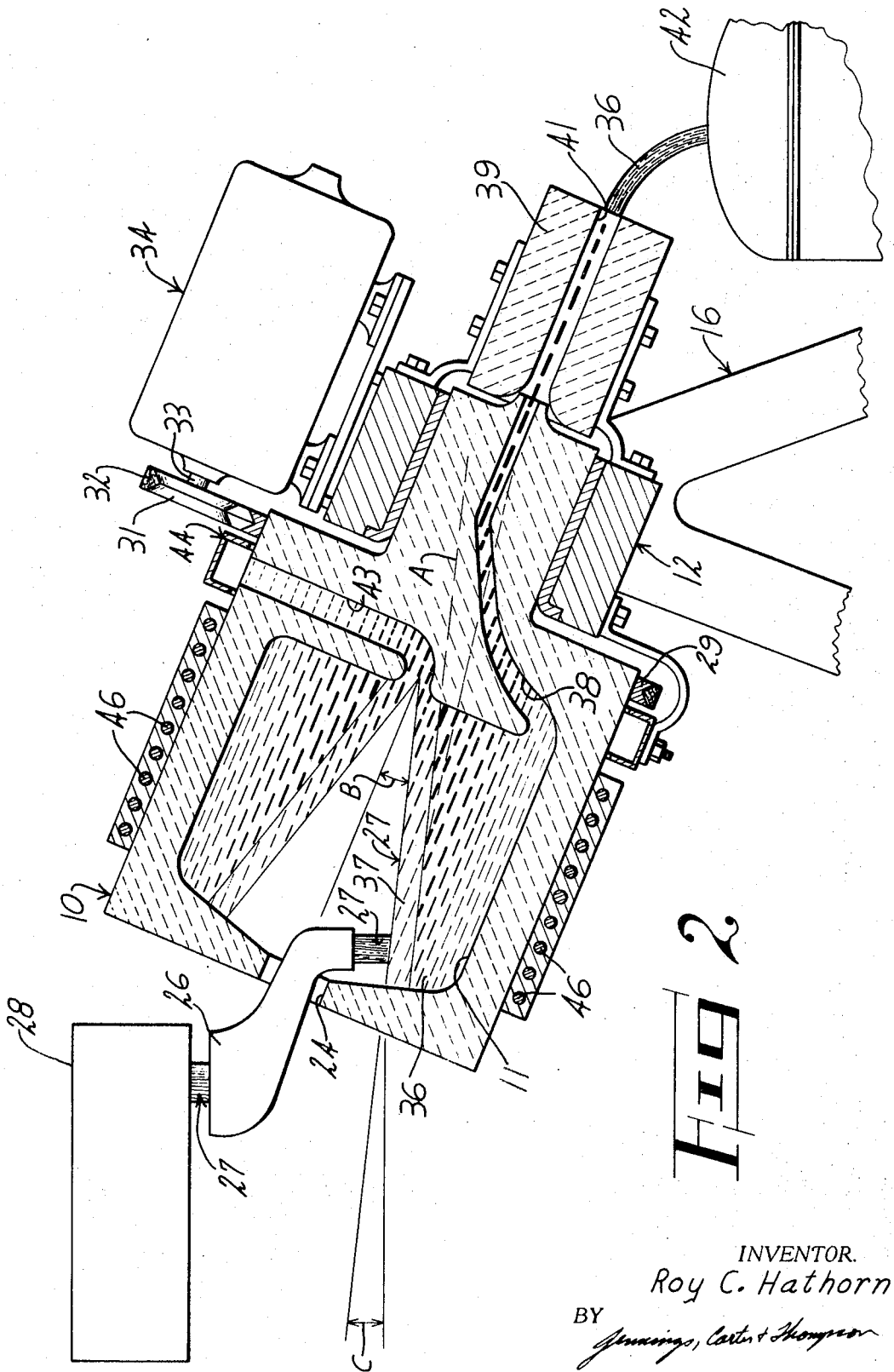

3,756,806
Patented Sept. 4, 1973

3,756,806
PROCESS AND APPARATUS FOR SEPARATING MOLTEN METAL FROM MIXTURES THEREOF WITH LIGHTER MATERIALS
Roy C. Hathorn, P.O. Box 1806,
Anniston, Ala. 36201
Filed July 19, 1971, Ser. No. 163,774
Int. Cl. C22b 9/02
U.S. Cl. 75—93 R
9 Claims

ABSTRACT OF THE DISCLOSURE

Method and apparatus for separating molten metal from a mixture thereof with lighter materials wherein mixture is introduced into the upper end of an inclined rotating chamber. The chamber is rotated at a speed and at an inclined angle to separate molten metal from lighter materials with outer surface of the mixture conforming to inner surface of chamber and inner surface of mixture forming a cone. Upon a predetermined increase in mixture level, molten metal is removed from outer portion of mixture adjacent lower end of the chamber and lighter materials are removed from inner portion of mixture adjacent lower end of the chamber.

BACKGROUND OF THE INVENTION

This invention relates to a method and apparatus for separating molten metal from a mixture thereof with lighter materials and more particularly to a process for degassing and purifying liquid metals in a continuous manner.

Heretofore in the art to which my invention relates, it has been difficult to degas and purify liquid metals due to the fact that it has been difficult to bring about a positive physical separation of the gases and impurities from the liquid metal. This is especially true in view of the fact that the gases and impurities are often embedded within the mixture whereby they do not move quickly and positively to the surface of the molten mixture.

BRIEF SUMMARY OF THE INVENTION

In accordance with my present invention, I bring about a positive and quick separation of molten metal from a mixture thereof with lighter materials by introducing the mixture into the upper end of an inclined, rotating chamber which is rotated at a speed and at an inclined angle to separate molten metal from lighter materials. The outer surface of the rotating mixture conforms to the inner surface of the chamber while the inner surface of the mixture forms a cone adjacent the axis of rotation of the chamber. Molten metal is removed in response to a predetermined increase in liquid level whereby the metal is continuously removed from the outer portion of the mixture adjacent the lower end of the chamber. Lighter materials are removed from the inner portion of the mixture adjacent the lower end of the chamber upon a predetermined increase in the mixture level.

Apparatus embodying features of my invention and which may be employed to carry out my improved process is illustrated in the accompanying drawings, forming a part of this application, in which:

FIG. 1 is a side elevational view of the apparatus, partly broken away; and

FIG. 2 is a vertical sectional view through the apparatus shown in FIG. 1.

Referring now to the drawings for a better understanding of my invention, I show a rotatable housing 10 having a chamber 11 therein for receiving a mixture consisting of molten metal and lighter materials, such as gases, impurities and the like. The housing 10 is mounted for rotation in a suitable bearing assembly 12 having stub shafts 13 projecting laterally from opposite sides thereof. The shafts 13 are supported by bearing blocks 14 which in turn are supported by a supporting frame 16.

As shown in FIGS. 1 and 2, the rotatable housing 10 is supported at an inclined angle. An actuating arm 17 is secured rigidly to one of the stub shafts 13 and depends therefrom, as shown in FIG. 1. The lower end of the arm 17 is pivotally connected by a pivot pin 18 to a piston rod 19 of a fluid pressure operated cylinder 21. The cylinder 21 is pivotally connected by a pivot pin 22 to a support bracket 23 carried by the supporting frame 16, as shown.

An inlet opening 24 is provided at the upper end of the inclined, rotatable housing 10, as shown in FIG. 2, for receiving the discharge end of a pouring boot 26. A mixture 27 consisting of molten metal and lighter materials, such as gas and impurities, is supplied to the pouring boot 26 by suitable means, such as a cupola spout 28.

An annular pulley 29 is carried by the rotary housing 10 and is operatively connected to a drive pulley 31 by a drive belt 32, such as a timing belt. The drive pulley 31 is mounted on a drive shaft 33 of a variable speed power unit indicated generally at 34.

The power unit 34 is adapted to rotate the housing 10 and its chamber 11 at a speed to separate molten metal, indicated at 36 from lighter materials indicated at 37. Centrifugal force acting on the molten metal causes it to conform to the inside of the chamber 11 while the lighter materials move toward the axis of rotation of the chamber 11. The surface of the lighter materials thus assumes a conical shape due to the fact that the chamber 11 and the rotary housing 10 rotate about an axis which is inclined relative to a horizontal plane passing through the chamber.

Communicating with a lower portion of the chamber 11 adjacent an outer portion of the mixture 27 is a molten metal outlet 38 which extends inwardly and away from the lower portion of the chamber 11 toward the axis of rotation of the housing 10, as shown in FIG. 2. The discharge end of the molten metal outlet 38 extends axially of the rotary housing 10.

Mounted adjacent the discharge end of the molten metal outlet 38 is a non-rotatable spout 39 having a passageway 41 therethrough for receiving the molten metal 36 as it is discharged from outlet 38. The molten metal passes from the spout 39 to a suitable mixing ladle indicated generally at 42.

Communicating with the chamber 11 and extending outwardly from a location adjacent the axis of rotation of the chamber 11 is a lighter materials outlet 43. That is, the outlet 43 communicates with the chamber 11 adjacent the lower end thereof and inwardly of the molten metal outlet 38 in position to discharge lighter materials from the chamber 11 in response to a predetermined increase in the level of the lighter materials 37 adjacent the lower end of the chamber 11. Surrounding the rotary housing 10 in position to receive the lighter materials 37 is a non-rotatable wet collector ring indicated generally at 44 which is adapted to break up the lighter materials and discharge the same through an outlet 45 into a suitable receptacle, not shown, in a manner well understood in the art to which my invention relates.

From the foregoing description, the operation of my improved process and apparatus will be readily understood. The rotary housing 10 is pivoted to a selected position by means of the fluid pressure operated cylinder 21 whereby the axis of rotation of the chamber 11 is supported in an inclined position, as shown. In separating molten iron from a mixture thereof with impurities, such as gases and slags, the housing 10 is pivoted to a position whereby the axis of rotation of the chamber 11 is inclined at an angle of approximately 15 degrees from a horizontal plane passing through the chamber 11. The housing 10 is rotated at a speed to impart approximately five gravities to the mixture 27 whereby centrifugal force is applied to the mixture thus causing the molten metal to conform to the inside of the chamber 11 while the inner surface of the lighter materials form a cone inside the molten metal. The mixture consisting of molten metal and lighter materials, such as gases and other lighter materials are introduced continuously through the pouring boot 26 whereby the centrifugal action on the molten metal increases the density and causes the impurities to flow positively toward the axis of rotation of the chamber 11 at an accelerated rate. When sufficient molten metal 36 has moved to the outer portion of the chamber 11 to position the level of the molten metal along a line A which is above the molten metal outlet, the molten metal will then commence to flow through the outlet 38 to the passageway 41 in the pouring spout 39 and is then discharged into the mixing ladle 42 for subsequent handling in a manner well understood in the art to which my invention relates.

As the mixture 27 is continuously introduced into the chamber 11, the lighter materials, such as gases, slag and the like move toward the axis of rotation of the chamber whereupon the light solid materials float on the heavier, molten metal 36 with the inner surface of the lighter materials 37 defining a cone. When the level of the lighter materials 37 is high enough it will flow out the discharge passageway 43 into the wet collector ring 44 whereupon the lighter materials are broken up and discharged to a suitable receptacle.

There are many variations of rotating speed and angle of inclination of the rotary mold 10 which may be employed, which depends upon the types of metal to be cleaned or purified. As shown in FIG. 2, the housing 10 is rotated in a clockwise direction about its pivot point to provide an included angle B between the axis of rotation of chamber 11 and a horizontal plane passing through the chamber 11 and the axis of rotation of the chamber. Also, the inner, conical surface of the lighter materials 37 define an included angle C with a horizontal plane passing through the chamber 11 and the inner surface of the lighter materials 37.

By changing the tilt angle of the rotary housing or by changing the speed of rotation whereby a continuation of a line along the surface of the molten metal, indicated at A, is below the inner portion of the molten metal outlet 38, the molten metal will cease to flow through the outlet 38 to the stationary spout 39. Accordingly, the discharge of molten metal from the outlet 38 may be commenced or stopped by merely changing the angle of inclination of the housing 10 by means of the cylinder 21 or by changing the speed of rotation through the power unit 34.

As shown in FIG. 2, the rotary housing 10 may be heated by suitable means, such as by providing heating coils 46 around the outer surface of the housing 10, as shown.

From the foregoing, it will be seen that I have devised an improved process and apparatus for separating molten metal from a mixture thereof with lighter materials. By providing means for continuously separating the heavier, molten metal from the lighter gases and other impurities in a positive manner, the molten metal is cleaned better and in a more efficient manner. By continuously removing the molten metal from the chamber 11 adjacent an outer portion of the mixture, only pure metal is withdrawn through the outlet 38.

While I have shown my invention in but one form, it will be obvious to those skilled in the art that it is not so limited, but is susceptible of various other changes and modifications without departing from the spirit thereof.

What I claim is:

1. The method of separating molten metal from a mixture thereof with lighter materials comprising the steps of:

(a) introducing a mixture of molten metal and lighter materials into the upper end of a collection chamber mounted for rotation about an axis which is inclined at an angle relative to a horizontal plane passing through said chamber to collect a pool of said mixture in said chamber, (b) rotating said chamber at a speed and at an inclined angle to separate molten metal from lighter materials and for the outer surface of the pool of said mixture to conform to the inside of said chamber with the inner surface of the pool of said mixture forming a cone having a taper toward the lower end of said chamber and having an axis of rotation which is also inclined relative to a horizontal plane passing through said chamber, (c) removing said molten metal from an outer portion of the pool of said mixture adjacent the lower end of said chamber in response to a predetermined increase in the level of said molten metal adjacent said lower end of said chamber, and (d) removing said lighter materials from an inner portion of the pool of said mixture adjacent the lower end of said chamber by centrifugal force in response to a predetermined increase in the level of said lighter materials adjacent said lower end of said chamber.

2. Apparatus for separating molten metal from a mixture thereof with lighter materials comprising:

(a) a rotatable housing having a collection chamber therein rotatable about an axis which is inclined at an angle relative to a horizontal plane passing through said chamber, (b) means for introducing a mixture of molten metal and lighter materials into the upper end of said chamber to collect a pool of said mixture in said chamber, (c) means for rotating said housing at a speed and at an inclined angle to separate molten metal from lighter materials and for the outer surface of the pool of said mixture to conform to the inside of said chamber with the inner surface of the pool of said mixture forming a cone having a taper toward the lower end of said chamber and having an axis of rotation which is also inclined relative to a horizontal plane passing through said chamber, (d) a molten metal outlet communicating with a lower portion of said chamber adjacent an outer portion of said chamber and disposed to discharged molten metal from said chamber in response to a predetermined increase in the level of said molten metal adjacent the lower end of said chamber, and (e) a lighter materials outlet communicating with said chamber adjacent the lower end thereof and inwardly of said molten metal outlet in position to discharge lighter materials from said chamber by centrifugal force in response to a predetermined increase in the level of said lighter materials adjacent the lower end of said chamber, (f) a collector ring which surrounds said housing and communicates with said lighter materials outlet for receiving said lighter materials discharged from said chamber.

3. Apparatus for separating molten metal from a mixture thereof with lighter materials as defined in claim 2 in which said molten metal outlet extends inwardly and away from said lower portion of said chamber toward the axis of rotation of said housing.

4. Apparatus for separating molten metal from a mixture thereof with lighter materials as defined in claim 2 in which a stationary spout is mounted adjacent the lower end of said housing and communicates with said molten metal outlet for receiving said molten metal discharged from said chamber.

5. Apparatus for separating molten metal from a mixture thereof with lighter materials as defined in claim 2 in which said lighter materials outlet extends outwardly and laterally of said housing from a location adjacent the axis of rotation of said chamber.

6. Apparatus for separating molten metal from a mixture thereof with lighter materials as defined in claim 2 in which said rotatable housing is mounted for pivotal movement in a vertical plane and means is provided to move said housing to selected tilted positions to vary the inclination of the axis of rotation of said housing.

7. Apparatus for separating molten metal from a mixture thereof with lighter materials as defined in claim 6 in which said means to move said housing to selected tilted positions comprises:
 (a) a supporting bearing for said housing,
 (b) means supporting said bearing for pivotal movement in a vertical plane, and
 (c) a fluid pressure operated power unit operatively connected to said housing for pivoting said housing and said supporting bearing to selected positions.

8. Apparatus for separating molten metal from a mixture thereof with lighter materials as defined in claim 7 in which said means rotating said housing comprises:
 (a) a power unit mounted on said supporting bearing, and
 (b) drive means operatively connecting said power unit to said housing.

9. Apparatus for separating molten metal from a mixture thereof with lighter materials as defined in claim 8 in which said power unit and said drive means is adapted to drive said housing at selected speeds.

References Cited
UNITED STATES PATENTS

| | | | |
|---|---|---|---|
| 2,395,286 | 2/1946 | Merle | 233—27 |
| 2,415,210 | 2/1947 | Hoefling | 233—46 |

FOREIGN PATENTS

| | | | |
|---|---|---|---|
| 15,156 | 11/1933 | Australia | 75—93 R |

L. DEWAYNE RUTLEDGE, Primary Examiner

M. J. ANDREWS, Assistant Examiner

U.S. Cl. X.R.

233—46; 266—37